(12) United States Patent
Leung

(10) Patent No.: US 6,452,917 B1
(45) Date of Patent: Sep. 17, 2002

(54) CHANNEL ESTIMATION IN A CDMA WIRELESS COMMUNICATION SYSTEM

(75) Inventor: Gilbert Leung, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/289,073

(22) Filed: Apr. 8, 1999

(51) Int. Cl.[7] .............................. H04Q 7/28; H04Q 7/00
(52) U.S. Cl. ........................ 370/342; 370/320; 370/334; 375/147
(58) Field of Search ................................ 370/320, 328, 370/329, 334, 335, 342, 441; 375/141, 145, 147, 149, 148

(56) References Cited

U.S. PATENT DOCUMENTS

| | | | |
|---|---|---|---|
| 3,351,859 A | 11/1967 | Groth et al. | |
| 4,112,257 A | 9/1978 | Frost | 179/2 |
| 4,222,115 A | 9/1980 | Cooper et al. | 375/1 |
| 4,291,410 A | 9/1981 | Caples et al. | 375/1 |
| 4,630,283 A | 12/1986 | Schiff | 375/1 |
| 4,669,091 A | 5/1987 | Nossen | 375/14 |
| 4,672,658 A | 6/1987 | Kavehrad et al. | 379/63 |
| 4,694,467 A | 9/1987 | Mui | 375/1 |
| 4,710,944 A | 12/1987 | Nossen | 375/40 |
| 4,736,460 A | 4/1988 | Rilling | 455/283 |
| 4,752,969 A | 6/1988 | Rilling | 455/278 |
| 4,765,753 A | 8/1988 | Schmidt | 379/60 |
| 4,797,950 A | 1/1989 | Rilling | 455/52 |
| 5,109,390 A | 4/1992 | Gilhousen et al. | 375/1 |
| 5,768,307 A | 6/1998 | Schramm et al. | 375/208 |
| 5,544,156 A | 8/1998 | Teder et al. | 370/18 |
| 5,907,586 A | * 5/1999 | Katsuragawa et al. | 370/342 |
| 6,175,588 B1 | * 1/2001 | Visotsky et al. | 375/148 |
| 6,208,632 B1 | * 3/2001 | Kowalski et al. | 370/335 |
| 6,219,344 B1 | * 4/2001 | Jones et al. | 370/335 |
| 6,272,168 B1 | * 8/2001 | Lomp et al. | 370/342 |

FOREIGN PATENT DOCUMENTS

| | | |
|---|---|---|
| EP | 0715440 | 6/1996 |

* cited by examiner

Primary Examiner—Nay Maung
(74) Attorney, Agent, or Firm—Philip R. Wadsworth; Kent D. Baker; Maryanne E. DeAngelo

(57) ABSTRACT

A method and apparatus for estimating channel conditions in a code-division multiple access (CDMA) communication system having a pilot signal and a traffic signal. The apparatus includes a pilot filter for generating channel estimates from the pilot signal and a circuit for reconstructing the traffic information bits after they have been decoded. A predictive channel estimation circuit generates predictive channel estimates from the original traffic signal demodulated by the reconstructed traffic information bits. A demodulator demodulates the traffic signal using the predictive channel estimates and the pilot signal channel estimates. By using the predictive channel estimates that contain signal energy from the traffic signal as a coherent reference, the channel conditions may be estimated more accurately than by using the pilot signal alone.

10 Claims, 4 Drawing Sheets

FIG. 1 --PRIOR ART--

--PRIOR ART--

CHANNEL ESTIMATION IN A CDMA WIRELESS COMMUNICATION SYSTEM

BACKGROUND OF THE INVENTION

I. Field of the Invention

The present invention relates to code-division multiple access (CDMA) wireless communication systems. More particularly, the present invention relates to a novel and improved method and apparatus for estimating channel conditions in a CDMA wireless communication system using decoded data.

II. Description of the Related Art

In a wireless radiotelephone communication system, many users communicate over a wireless channel. Communication over the wireless channel can be one of a variety of multiple access techniques that allow a large number of users in a limited frequency spectrum. These multiple access techniques include time division multiple access (TDMA), frequency division multiple access (FDMA), and code division multiple access (CDMA).

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In each of the above patents, the use of a forward-link (base station to mobile station) pilot signal is disclosed. In a typical CDMA wireless communication system, such as that described in EIA/TIA IS-95, the pilot signal is a "beacon" transmitting a constant zero symbol and spread with the same pseudonoise (PN) sequences used by the traffic bearing signals. The pilot signal is typically covered with the all-zero Walsh sequence. During initial system acquisition, the mobile station searches through PN offsets to locate a base station's pilot signal. Once it has acquired the pilot signal, it can then derive a stable phase and magnitude reference for coherent demodulation, such as that described in U.S. Pat. No. 5,764,687 entitled "Mobile Demodulator Architecture For A Spread Spectrum Multiple Access Communication System," issued Jun. 9, 1998, assigned to the assignee of the present invention, and incorporated herein by reference.

A functional block diagram of a typical prior art forward link data formatter as used by a CDMA base station is shown in FIG. 1. Data source 102 may be, for example, a variable rate vocoder such as that described in U.S. Pat. No. 5,657,420, entitled "Variable Rate Vocoder", issued Aug. 8, 1997, assigned to the assignee of the present invention and incorporated herein by reference. Data source 102 generates traffic channel information in the form of frames of digital data. CRC and tail bit generator 104 calculates and appends cyclic redundancy check (CRC) bits and tail bits to the frames generated by data source 102. The frame is then provided to encoder 106, which provides forward error correction coding, such as convolutional encoding, upon the frame as is known in the art. The encoded symbols are provided to repetition generator 120, which repeats the reordered symbols to provide the appropriate modulation symbol rate. The repeated symbols are then provided to interleaver 108, which re-orders the symbols in accordance with a predetermined interleaver format. The repeated, interleaved symbol stream is then covered with one of a set of orthogonal Walsh sequences in traffic Walsh coverer 122, and gain adjusted in gain element 124. It should be understood that other forward link data formatters are also known in the art. For example, it is well known that the repetition generator 120 may be placed after the interleaver 108.

Pilot signal generator 128 generates a pilot signal, which may be a sequence of all ones. The pilot signal is then covered with the all-one Walsh sequence and combined with the output of gain element 124 in combiner 136. The combined pilot channel and traffic channel data (which may be plus or minus ones) is then spread in PN spreader 138 using a complex PN code generated by PN generator 140, and then transmitted by radio frequency transmitter 142 over antenna 144. A similar forward link data formatter is disclosed in co-pending U.S. Pat. No. 6,396,804, entitled "High Data Rate CDMA Wireless Communication System", issued May 28, 2002, assigned to the assignee of the present invention and incorporated by reference herein.

Other data formatting techniques also exist. For example, in the cdma2000 reverse link, the pilot signal is time-multiplexed with power control commands. Additionally, in W-CDMA, the forward link uses dedicated pilot signals that are time-multiplexed with other information.

FIG. 2 illustrates a functional block diagram of a typical prior art data demodulator for use in a CDMA mobile station. Receiver 202 receives and downconverts the signals transmitted by transmitter 142 of FIG. 1. The digital baseband output of receiver 202 is despread in PN despreader 204 using the complex PN code generated PN generator 206, which is the same complex PN code as that generated by PN generator 140 of FIG. 1.

The despread signal is then Walsh uncovered in traffic channel Walsh uncoverer 208 using the same Walsh sequence as that of the traffic channel Walsh coverer 122 of FIG. 1. The Walsh-uncovered chips are then accumulated into Walsh symbols in Walsh chip summer 210 and provided as a traffic channel signal to dot product circuit 212. In some applications, an additional delay element (not shown) is introduced between Walsh chip summer 210 and dot product circuit 212 to account for delays introduced by pilot filter 216. However, if pilot filter 216 is a causal filter, such a delay element (not shown) is not necessary. The dot product circuit is also known as a "conjugate product" circuit. It performs the operation expressed mathematically by one of the following equivalent forms: $<a,b>=a \cdot b=ab^*$.

The despread signal is also provided to Walsh chip summer 214 where they are accumulated into Walsh symbols and provided to pilot filter 216 as pilot channel symbols. Note that since the pilot channel is covered with the all-one Walsh sequence in Walsh coverer 134 of FIG. 1, a vacuous operation, the corresponding uncoverer is also vacuous in operation. However, in the general case, the pilot signal may be uncovered using any same Walsh sequence as is used to cover it. The pilot filter 216 serves to reject the noise in the pilot symbols, providing a phase and scale reference for the dot product circuit 212.

Once per symbol, the dot product circuit 212 computes the component of the traffic channel signal in phase with the pilot channel signal generated by the pilot filter 216. As described in U.S. Pat. No. 5,506,865, entitled "Pilot Carrier Dot Product Circuit", issued Apr. 9, 1996, assigned to the assignee of the present invention and incorporated herein by reference, the dot product adjusts both the received signal's phase and scale as needed for coherent demodulation.

The symbols output from dot product circuit 212 are de-interleaved in de-interleaver 218, using the same format used by interleaver 108 of FIG. 1. The de-interleaved symbols are then decoded in decoder 220 according to the error correcting codes employed by encoder 106 of FIG. 1. The resulting decoded symbols are analyzed on a frame-by-frame basis by quality indicator CRC Check 222 to ensure that the frame was properly decoded. If the frame was properly decoded, then that decoded frame is forwarded for further processing. Quality indicator CRC Check 222 typically would examine the CRC portion of the frame, but may also use other frame quality indications such as Yamamoto metrics.

In a typical CDMA wireless communication system, such as that described in EIA/TIA IS-95, the pilot signal energy may be less than the traffic signal energy, depending on the data rate. Additionally, in recently proposed third-generation (3G) CDMA wireless communication systems, the pilot signal may not be transmitted continuously, but rather it may share time with a power control signal. For example, in a cdma2000 system, the reverse link pilot signal shares time with a multiplexed power control bit. In the W-CDMA system, the forward link dedicated pilot channels are time-multiplexed. When the pilot signal is weak or non-existent, coherent demodulation performance is degraded. Thus, a CDMA wireless communication system would benefit greatly from additional signal energy being used to provide a coherent channel reference and for estimation of the channel statistics.

SUMMARY OF THE INVENTION

The present invention is a novel and improved method and apparatus for estimating channel conditions in a code-division multiple access (CDMA) communication system having a pilot signal and a traffic signal. As used herein, the term "traffic" signal is used to refer to a data-bearing signal other than the pilot signal. For example, the traffic signal may carry voice or data generated by one or more users, or it may carry overhead information generated by the communication system.

The apparatus includes a pilot filter for generating pilot signal channel estimates from the pilot signal and a circuit for reconstructing the traffic information bits after they have been decoded. The original traffic signal is demodulated by the reconstructed traffic information bits and is henceforth referred to as the "traffic-based channel reference". A predictive channel estimation circuit generates predictive channel estimates from the traffic-based channel reference and a delayed pilot signal. A demodulator demodulates the traffic signal using the predictive channel estimates and the pilot-based channel estimates. By using the predictive channel estimates that contain signal energy from the traffic signal in addition to that from the pilot signal, the channel conditions may be estimated more accurately.

The predictive channel estimation circuit includes a delay element for delaying the pilot signal to match the timing of the reconstructed traffic signal. A combiner combines the delayed pilot signal with the traffic-based channel reference signal. The combiner may weight the traffic-based channel reference signal relative to the delayed pilot signal according to quality indicators of the reconstructed traffic channel information bits. A predictive channel estimator generates the predictive channel estimates from the combined delayed pilot signal and traffic-based channel reference signal.

The circuit for generating the traffic-based channel reference signal depends on the format used to generate the data signal waveform. However, in the preferred embodiment, it includes an encoder for encoding data symbols recovered from the traffic signal, and an interleaver for interleaving the data symbols. Additionally, the demodulator may include a controller for weighting the predictive channel estimates according to a relative age of the predictive channel estimates.

In one application of the present invention, the controller also determines whether channel statistics of the pilot signal channel estimate and the predictive channel estimate are correlated over a predetermined time period. The present invention also includes a method for estimating channel conditions. The method described herein may perform by the apparatus described herein.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 2:
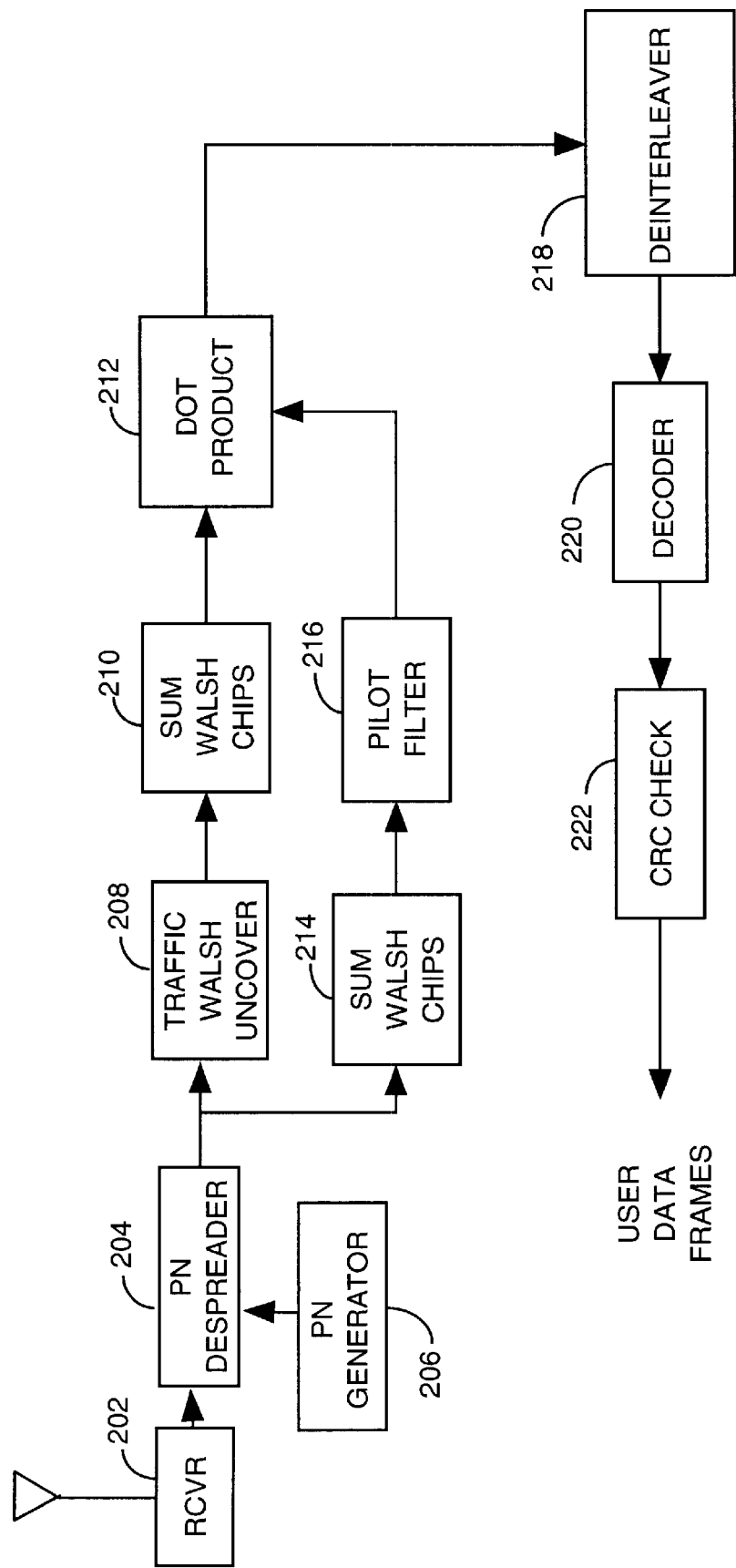
FIG. 2 is a functional block diagram of a typical prior art data demodulator for use in a CDMA mobile station.
Figure 3:
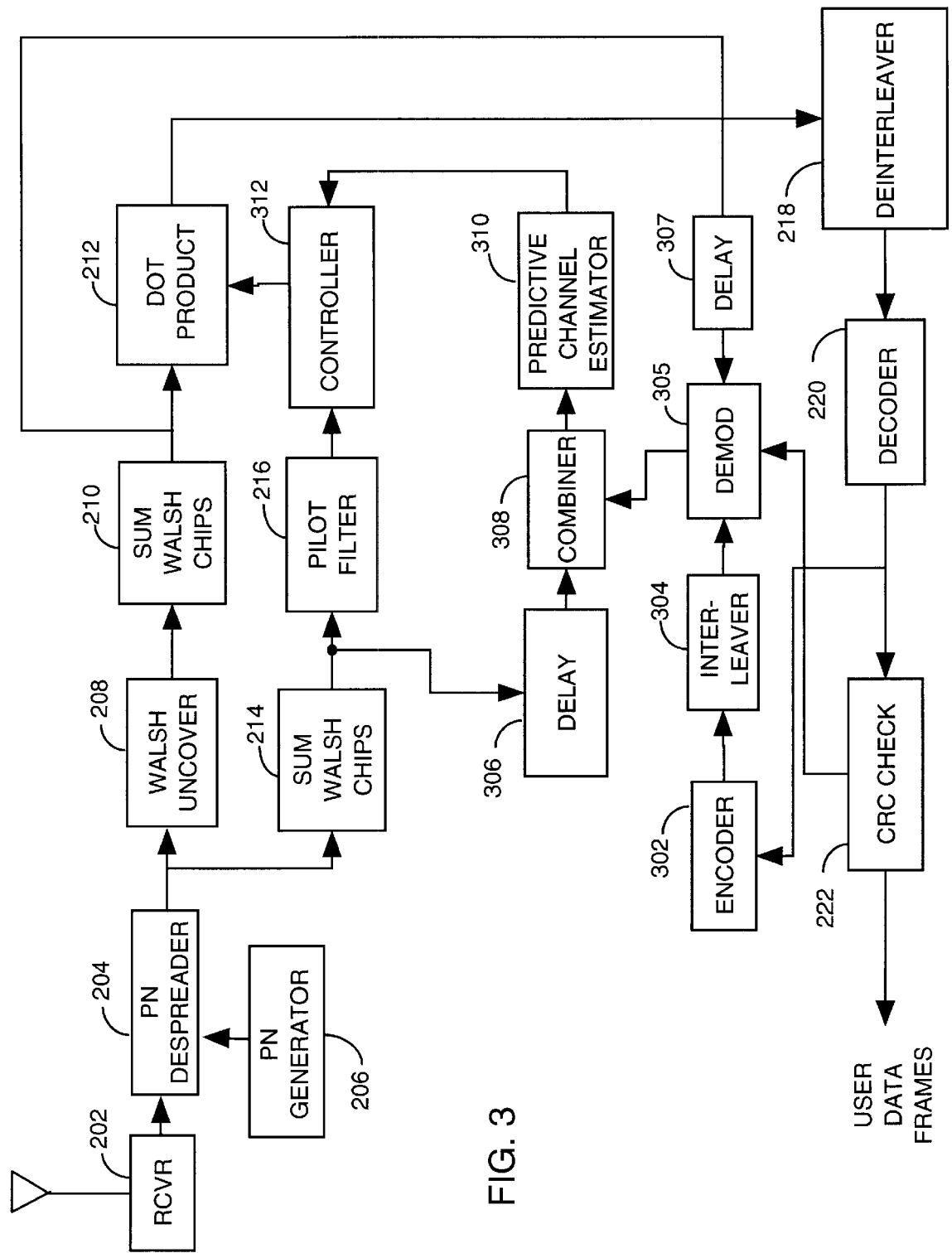
FIG. 3 is an exemplary functional block diagram of the apparatus of the present invention.

FIG. 3 illustrates an exemplary functional block diagram of the apparatus of the present invention. Blocks labeled with like numerals as FIG. 2 correspond to similar elements as those described with reference to FIG. 2, and perform similar functions. However, significant additional functional blocks absent from FIG. 2 are illustrated in FIG. 3 that form the basis of the present invention.

Figure 1:
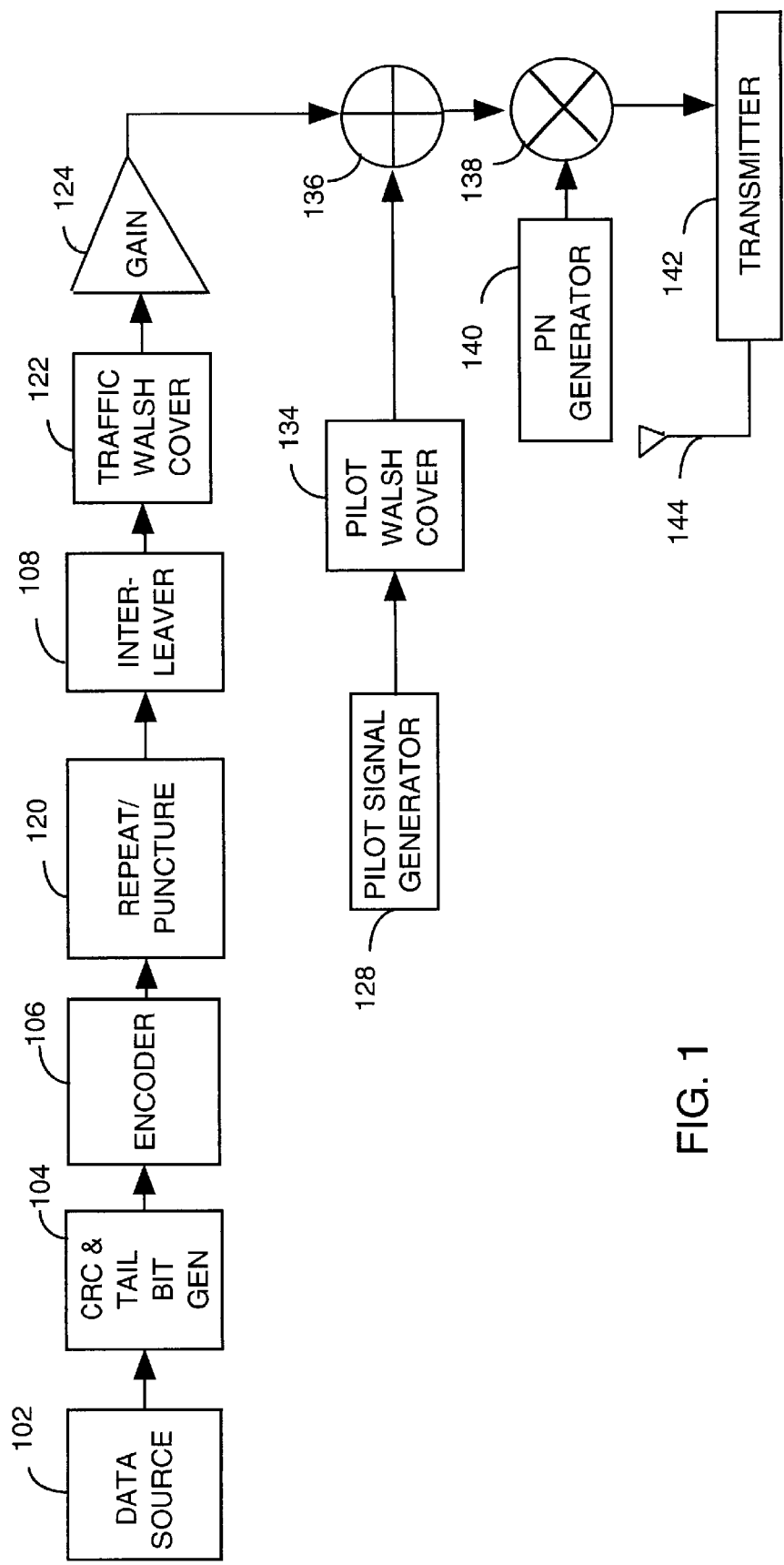
FIG. 1 is a functional block diagram of a typical prior art forward link data formatter as used by a CDMA base station.

As in FIG. 2, the output of quality indicator CRC Check 222 is provided as user data for further processing to recover the information contained therein. However, in contrast to the demodulator of FIG. 2, the input of quality indicator CRC Check 222 is provided to encoder 302, which re-encodes the data symbols using the same forward error correction coding techniques as that of encoder 106 of FIG. 1. The re-encoded symbols from encoder 302 are then provided to interleaver 304, which re-interleaves the symbols from encoder 302 are then provided to format used by interleaver 108 of FIG. 1. The output of interleaver 304 thus comprises re-encoded, re-interleaved data symbols. If they have been decoded properly as determined by quality indicator CRC Check 222, these re-constructed data symbols output from interleaver 304 represent good extimates of the signs of the data symbols being output by Walsh chip summer 210.

In demodulator 305, these re-encoded, re-interleaved data symbols that represent the reconstructed traffic channel information bits are used to demodulate the traffic channel symbols output from Walsh chip summer 210, as delayed by delay element 307. The amount of delay introduced by delay element 307 is designed to match the computing delay introduced by dot product circuit 212, deinterleaver 218, decoder 220, encoder 302, and interleaver 304. The resulting demodulated signal output from demodulator 305 to combiner 308 is referred to herein as the traffic-based channel reference.

The output of Walsh chip summer 214 is delayed in delay element 306. The amount of delay introduced by delay element 306 is designed to match the computational delays introduced by deinterleaver 218, decoder 220, encoder 302, interleaver 304, and demodulator 305 so that the pilot signal output from delay element 306 is time-aligned with the traffic-based channel reference output from demodulator 305. The pilot symbols and the traffic-based channel reference are combined in combiner 308 and provided to predictive channel estimator 310. Combiner 308 combines the delayed pilot symbols and traffic-based channel reference signal in a weighted fashion, according to quality indicators of the decoded traffic frame, such quality indicator CRC Check 222. In a more general case, other quality indicators, such as the signal-to-noise-ratio estimates of the traffic symbols, can also be used. For example, if the traffic frame was properly decoded (and thus the bits are known with high confidence), the traffic-based channel reference signal is given a higher weight than if the traffic frame was not properly decoded.

Predictive channel estimator 310 recovers the magnitude and phase information of the channel reference from the combined pilot and traffic-based channel reference output from combiner 308. In the preferred embodiment, predictive channel estimator 310 is similar in construction to pilot filter 216, and may be a simple first-order IIR filter or a FIR filter.

The pilot symbols output from pilot filter 216 and the combined pilot and traffic-based channel reference signal output from predictive channel estimator 310 are received as inputs to controller 312. Controller 312 combines the pilot symbols output from pilot filter 216, and the combined pilot and traffic-based channel reference signal output from predictive channel estimator 310 to dot product circuit 212 for use in the phase adjustment and scaling operations performed by dot product circuit 212.

Controller 312 preferably uses a dynamic weighted combining technique when combining the pilot symbols output from pilot filter 216 with the combined pilot and traffic-based channel reference signal output from predictive channel estimator 310. The weighted combining technique accounts for the relative latency or "age" of the combined pilot and traffic-based channel reference signal output from predictive channel estimator 310. Because of the time necessary to re-encode and re-interleave the reconstructed data symbols, their usefulness in estimating the channel conditions depends heavily on how quickly the channel conditions are changing. If the channel conditions are relatively slow changing as compared to the time required to reconstruct the traffic channel data symbols, then the reconstructed data symbol energy is more useful than if the channel conditions are rapidly changing. In either case, the predictive channel estimate output from predictive channel estimator 310 becomes stale as time passes.

Thus, in the preferred embodiment, controller 312 weights the combined pilot and traffic-based channel reference signal output from predictive channel estimator 310 according to its age. For example, during the first part of a successive frame, when the predictive channel estimate has just been calculated, the controller 312 weights it with a relatively high weighting factor. However, as time passes during the frame, the controller 312 weights it with successively smaller and smaller weighting factors so that it contributes less and less to the channel estimate being provided to dot product circuit 212. When predictive channel estimator 310 calculates a new predictive channel estimate, controller 312 again weights it with a relatively high weighting factor, and so on. In this way, controller 312 accounts for the "age" or latency of the predictive channel estimate.

In another aspect of the present invention, controller 312 also uses the added energy of the predictive channel estimates from predictive channel estimator 310 to determine the channel statistics. For example, when the mobile station containing the present invention is stationary, or traveling at a slow speed, then the channel conditions are relatively stable over time. Conversely, when the mobile station containing the present invention is traveling at a relatively fast speed, the channel conditions will generally be uncorrelated over time.

Controller 312 samples the predictive channel estimate output from predictive channel estimator 310 at different pairs of times with a fixed time offset in each pair, and then takes the conjugate product of the pair samples to determine correlation. If the samples are highly correlated, then we infer that the channel conditions are relatively stable over time. If the two samples are not correlated, then we infer that the channel conditions are changing significantly between the sampling time pairs separated by the fixed time offset. By using the additional energy recovered from the traffic channel, controller 312 is able to more accurately determine the channel statistics than by using only the output of pilot filter 216.

Figure 4:
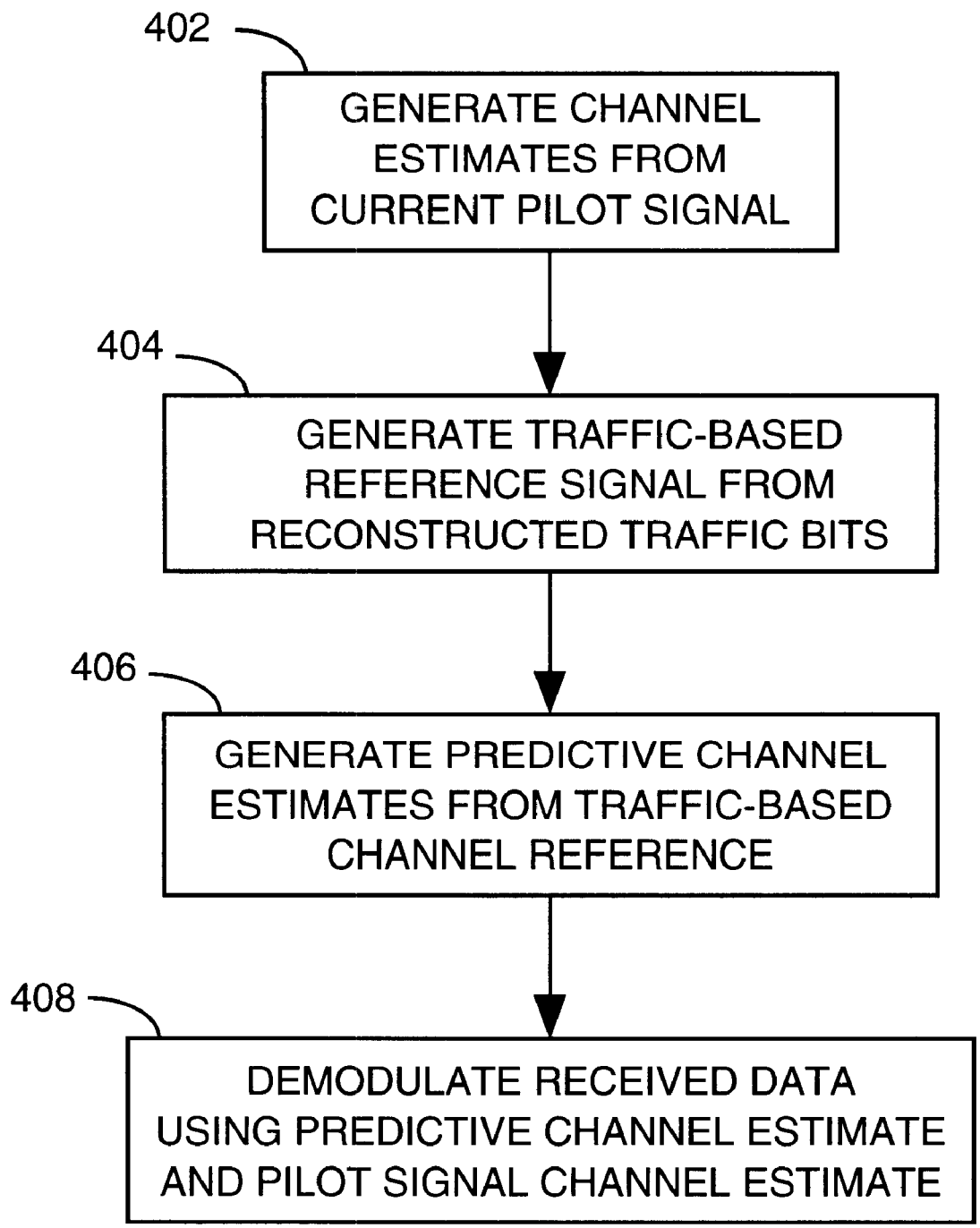
FIG. 4 is a flowchart of the method of the present invention.

The method of the present invention is illustrated in FIG. 4. At block 402 channel estimates are generated from the current pilot signal. This may be performed, for example, by pilot filter 216 of FIG. 3. At block 404, the traffic-based channel reference is generated from the reconstructed traffic information bits. This may include re-encoding by re-encoder 302, re-interleaving by interleaver 304, and demodulation by demodulator 305. At block 406, predictive channel estimates are generated from the traffic-based channel reference. This may be accomplished, for example, by predictive channel estimator 310. At block 408, the received traffic signal is conjugate multiplied using the predictive channel estimates from block 406 and the pilot-based channel estimates from block 402. This may be accomplished, for example, by controller 312 in conjunction with dot product circuit 212.

It should be noted that in the present invention, the additional energy from the predictive channel estimates are also used by controller 312 to assist in determining whether the channel statistics correlate over the predetermined time frame. This additional energy in the predictive channel estimate increases the accuracy of the determination. However, estimating channel statistics represents only one of the additional applications for the additional signal energy recovered from the predictive channel estimate besides assisting in coherent demodulation. The teachings of the present invention are equally applicable to many other applications where additional signal energy may be useful in making a more accurate determination of the channel conditions.

Thus, the present invention provides a method and apparatus for using a traffic-based channel reference for estimating the channel conditions for coherent demodulation. Additionally, the present invention as described above may be used to assist in determining the correlation of the channel statistics over a predetermined time period. Thus, the present invention increases the accuracy of the channel estimate when the pilot signal energy is weak or nonexistent.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for estimating channel conditions in a code-division multiple access (CDMA) communication system having a pilot signal and a traffic signal, the method comprising the steps of:

generating pilot signal channel estimates from said pilot signal;

reconstructing said traffic signal;

generating a traffic-based channel reference signal from said reconstructed traffic signal;

generating predictive channel estimates from said traffic-based channel reference signal; and demodulating said traffic signal using said predictive channel estimates and said pilot signal channel estimates.

2. The method of claim 1 wherein said step of generating a predictive channel estimate further comprises the steps of:

delaying said pilot signal;

combining said delayed pilot signal with said traffic-based channel reference signal; and generating said predictive channel estimates from said combined delayed pilot signal and traffic-based channel reference signal.

3. The method of claim 1 wherein said step of reconstructing said traffic signal further comprises the steps of:

encoding data symbols recovered from said traffic signal; and interleaving said data symbols.

4. The method of claim 1 wherein said step of demodulating said traffic signal further comprises the step of weighting said predictive channel estimates according to a relative age of said predictive channel estimates.

5. The method of claim 1 further comprising the step of determining whether channel statistics of said predictive channel estimate are correlated over a predetermined time period.

6. An apparatus for estimating channel conditions in a code-division multiple access (CDMA) communication system having a pilot signal and a traffic signal, the apparatus comprising:

a pilot filter for generating a pilot signal channel estimates from said pilot signal;

a circuit for reconstructing said traffic signal;

a circuit for generating a traffic-based channel reference signal from said reconstructed traffic signal;

a predictive channel estimation circuit for generating predictive channel estimates from said traffic-based channel reference signal; and a demodulator for demodulating said traffic signal using said predictive channel estimates and said pilot signal channel estimates.

7. The apparatus of claim 6 wherein said predictive channel estimation circuit further comprises:

a delay element for delaying said pilot signal;

a combiner for combining said delayed pilot signal with said traffic-based channel reference signal; and a predictive channel estimator for generating said predictive channel estimates from said combined delayed pilot signal and traffic-based channel reference signal.

8. The apparatus of claim 6 wherein said circuit for reconstructing said traffic signal further comprises:

an encoder for encoding data symbols recovered from said traffic signal; and an interleaver for interleaving said data symbols.

9. The apparatus of claim 6 wherein said demodulator further comprises a controller for weighting said predictive channel estimate according to a relative age of said predictive channel estimates.

10. The apparatus of claim 6 further comprising a controller for determining whether channel statistics of said predictive channel estimates are correlated over a predetermined time period.

* * * * *